US011454291B2

(12) United States Patent
Deferme

(10) Patent No.: US 11,454,291 B2
(45) Date of Patent: Sep. 27, 2022

(54) DAMPER WITH CONTROL VALVES

(71) Applicant: Tenneco Automotive Operating Company Inc., Lake Forest, IL (US)

(72) Inventor: Stefan Deferme, Heusden-Zolder (BE)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 492 days.

(21) Appl. No.: 16/235,034

(22) Filed: Dec. 28, 2018

(65) Prior Publication Data

US 2019/0136932 A1 May 9, 2019

(51) Int. Cl.
*F16F 9/06* (2006.01)
*F16F 9/18* (2006.01)
*B60G 13/00* (2006.01)
*B60G 13/08* (2006.01)
(Continued)

(52) U.S. Cl.
CPC ............ *F16F 9/062* (2013.01); *B60G 13/008* (2013.01); *B60G 13/08* (2013.01); *B60G 17/0152* (2013.01); *B60G 17/08* (2013.01); *F16F 9/065* (2013.01); *F16F 9/185* (2013.01); *B60G 2202/24* (2013.01); *B60G 2206/41* (2013.01); *B60G 2206/8201* (2013.01); *B60G 2500/10* (2013.01); *B60G 2500/11* (2013.01); *B60G 2800/162* (2013.01); *F16F 2222/12* (2013.01); *F16F 2226/048* (2013.01); *F16F 2228/066* (2013.01)

(58) Field of Classification Search
CPC .. F16F 9/062; F16F 9/065; F16F 9/185; F16F 2222/12; F16F 2226/048; F16F 2228/066; B60G 13/008; B60G 13/08; B60G 17/0152; B60G 17/08; B60G 2202/24; B60G 2206/41; B60G 2206/8201; B60G 2500/10; B60G 2500/11; B60G 2800/162

See application file for complete search history.

(56) References Cited

U.S. PATENT DOCUMENTS 4,802,561 A * 2/1989 Knecht ................... F16F 9/465
188/266.6
4,960,188 A 10/1990 Wossner
(Continued)

FOREIGN PATENT DOCUMENTS

DE 19527849 8/1996
DE 4423515 C2 7/1998
(Continued)

*Primary Examiner* — Robert A. Siconolfi
*Assistant Examiner* — James K Hsiao
(74) *Attorney, Agent, or Firm* — McGarry Bair PC

(57) ABSTRACT

A damper includes an inner tube. The damper includes a piston slidably disposed within the inner tube. The piston defines a first working chamber and a second working chamber within the inner tube. The damper also includes an outer tube disposed around the inner tube. The outer tube defines an outer chamber between the inner tube and the outer tube. The damper further includes a cover member mounted on an outer surface of the outer tube. The cover member defines a collector chamber between the outer tube and the cover member. The damper includes a first control valve mounted on the cover member. The damper also includes a second control valve mounted on the cover member and spaced apart from the first control valve.

20 Claims, 11 Drawing Sheets

(51) Int. Cl.
  *B60G 17/015* (2006.01)
  *B60G 17/08* (2006.01)

(56) References Cited

U.S. PATENT DOCUMENTS

| | | | | |
|---|---|---|---|---|
| 5,178,240 A * | 1/1993 | Houghton | ............... | F16F 9/003 |
| | | | | 137/513.7 |
| 5,195,619 A * | 3/1993 | Dourson | ............... | F16F 9/003 |
| | | | | 188/266.3 |
| 5,301,412 A | 4/1994 | Hahn et al. | | |
| 5,335,757 A * | 8/1994 | Knecht | ............... | F16F 9/325 |
| | | | | 188/266.6 |
| 5,375,683 A * | 12/1994 | Huang | ............... | F16F 9/096 |
| | | | | 188/266.6 |
| 5,431,259 A * | 7/1995 | Mizutani | ............... | B60G 17/08 |
| | | | | 188/266.4 |
| 5,558,189 A | 9/1996 | Beck | | |
| 5,586,627 A * | 12/1996 | Nezu | ............... | B60G 17/08 |
| | | | | 188/266.6 |
| 5,588,510 A * | 12/1996 | Wilke | ............... | F16F 9/064 |
| | | | | 188/266.6 |
| 5,603,392 A * | 2/1997 | Beck | ............... | F16F 9/325 |
| | | | | 188/266.6 |
| 5,649,611 A * | 7/1997 | Nakadate | ............... | B60G 17/08 |
| | | | | 188/266.6 |
| 5,788,030 A * | 8/1998 | Rottenberger | ............... | F16F 9/34 |
| | | | | 188/290 |
| 5,901,820 A * | 5/1999 | Kashiwagi | ............... | F16F 9/46 |
| | | | | 188/266.6 |
| 5,934,422 A * | 8/1999 | Steed | ............... | F16F 9/46 |
| | | | | 188/318 |
| 6,129,368 A * | 10/2000 | Ishikawa | ............... | B60G 17/0162 |
| | | | | 280/124.112 |
| 6,283,259 B1 * | 9/2001 | Nakadate | ............... | F16F 9/369 |
| | | | | 188/322.2 |
| 6,427,986 B1 * | 8/2002 | Sakai | ............... | B60G 15/14 |
| | | | | 188/266.6 |
| 6,527,093 B2 * | 3/2003 | Oliver | ............... | F16F 9/464 |
| | | | | 188/315 |
| 6,978,871 B2 * | 12/2005 | Holiviers | ............... | F16F 9/325 |
| | | | | 188/266.6 |
| 7,562,750 B2 * | 7/2009 | Lemmens | ............... | B60G 17/08 |
| | | | | 188/266.1 |
| 7,950,506 B2 * | 5/2011 | Nowaczyk | ............... | F16F 9/466 |
| | | | | 188/266.6 |
| 8,157,276 B2 | 4/2012 | Noda et al. | | |
| 8,495,947 B2 | 7/2013 | Hata | | |
| 8,511,447 B2 | 8/2013 | Nowaczyk et al. | | |
| 9,062,737 B2 * | 6/2015 | Hoult | ............... | F16F 9/26 |
| 9,080,631 B2 * | 7/2015 | Hoult | ............... | B60G 21/06 |
| 10,473,179 B2 * | 11/2019 | Ripa | ............... | F16F 9/3488 |
| 2005/0121268 A1 * | 6/2005 | Groves | ............... | F16F 9/464 |
| | | | | 188/266.6 |
| 2007/0000743 A1 * | 1/2007 | Naitou | ............... | B60G 15/12 |
| | | | | 188/322.2 |
| 2013/0081913 A1 * | 4/2013 | Nowaczyk | ............... | B23K 11/14 |
| | | | | 188/315 |
| 2015/0047937 A1 * | 2/2015 | Kim | ............... | F16F 9/461 |
| | | | | 188/322.13 |
| 2015/0191069 A1 * | 7/2015 | Zuleger | ............... | F16F 9/465 |
| | | | | 280/124.16 |
| 2016/0214453 A1 * | 7/2016 | Tanahashi | ............... | B60R 16/06 |
| 2017/0284497 A1 * | 10/2017 | Uotani | ............... | F16F 9/3257 |
| 2018/0135720 A1 * | 5/2018 | De Kock | ............... | F16F 9/3235 |
| 2019/0309816 A1 * | 10/2019 | Shibata | ............... | B60G 13/005 |
| 2020/0124129 A1 * | 4/2020 | Mohammadi | ............... | B21D 22/02 |

FOREIGN PATENT DOCUMENTS

| | | |
|---|---|---|
| DE | 4324444 | 11/2000 |
| DE | 10355151 | 6/2005 |
| DE | 102015209179 A1 | 11/2016 |
| DE | 102015224811 A1 | 6/2017 |
| EP | 0635655 | 1/1995 |
| EP | 1508723 | 2/2005 |
| JP | 2017146277 A | 8/2017 |
| WO | 2017182198 | 10/2017 |

* cited by examiner

DAMPER WITH CONTROL VALVES

TECHNICAL FIELD

The present disclosure generally relates to dampers. More particularly, the present disclosure relates to a damper with control valves.

BACKGROUND

Vehicles generally include dampers that are used in conjunction with suspension systems to absorb vibrations which occur while driving the vehicle. In order to absorb the vibrations, dampers are generally connected between a body and the suspension system of the vehicle. A piston is located within the damper which is connected to the body of the vehicle through a rod. Furthermore, a damper body is connected to the suspension system. As the damper is compressed or extended, the piston may limit a flow of damping fluid within working chambers defined within the damper body due to which the damper produces a damping force which counteracts the vibrations. By further restricting the flow of damping fluid within the working chambers of the damper, greater damping forces may be generated by the damper.

The damper typically includes one or more valves that control flow of fluid during rebound and compressive motions of the piston. Current damper designs include a valve block that accomplishes mutual hydraulic connections between the working chambers, the valves, and an accumulator of the damper. Such a design of the damper may make the damper bulky and increases an overall cost of the damper. Given description covers one or more above mentioned problems and discloses a damper to solve the problems.

SUMMARY

In an aspect of the present disclosure, a damper is provided. The damper includes an inner tube. The damper includes a piston slidably disposed within the inner tube. The piston defines a first working chamber and a second working chamber within the inner tube. The damper also includes an outer tube disposed around the inner tube. The outer tube defines an outer chamber between the inner tube and the outer tube. The outer chamber is in fluid communication with the first working chamber. The damper further includes a cover member mounted on an outer surface of the outer tube. The cover member defines a collector chamber between the outer tube and the cover member. The damper includes a first control valve mounted on the cover member. An inlet of the first control valve is in fluid communication with the outer chamber and an outlet of the first control valve is in fluid communication with the collector chamber. The damper also includes a second control valve mounted on the cover member and spaced apart from the first control valve. An inlet of the second control valve is in fluid communication with the second working chamber and an outlet of the second control valve is in fluid communication with the collector chamber.

In another aspect of the present disclosure, a damper is provided. The damper includes an inner tube. The damper also includes a piston slidably disposed within the inner tube. The piston defines a first working chamber and a second working chamber within the inner tube. The damper further includes an outer tube disposed around the inner tube. The outer tube defines an outer chamber between the inner tube and the outer tube. The outer chamber is in fluid communication with the first working chamber. The damper includes a cover member mounted on an outer surface of the outer tube. The cover member defines a collector chamber between the outer tube and the cover member. The damper also includes a first control valve mounted on the cover member. An inlet of the first control valve is in fluid communication with the outer chamber and an outlet of the first control valve is in fluid communication with the collector chamber. The damper further includes a second control valve mounted on the cover member and spaced apart from the first control valve. An inlet of the second control valve is in fluid communication with the second working chamber and an outlet of the second control valve is in fluid communication with the collector chamber. The damper further includes a first check valve disposed within the cover member. The first check valve is operable to allow flow of fluid from the collector chamber to the outer chamber. The damper also includes a second check valve disposed within the cover member. The second check valve is operable to allow flow of fluid from the collector chamber to the second working chamber.

In yet another aspect of the present disclosure, a damper is provided. The damper includes an inner tube. The damper also includes a piston slidably disposed within the inner tube. The piston defines a first working chamber and a second working chamber within the inner tube. The damper further an outer tube disposed around the inner tube. The outer tube defines an outer chamber between the inner tube and the outer tube. The outer chamber is in fluid communication with the first working chamber. The damper includes a cover member mounted on an outer surface of the outer tube. The cover member defines a collector chamber between the outer tube and the cover member. The damper also includes a first control valve mounted on the cover member. An inlet of the first control valve is in fluid communication with the outer chamber and an outlet of the first control valve is in fluid communication with the collector chamber. The damper further includes a second control valve mounted on the cover member and spaced apart from the first control valve. An inlet of the second control valve is in fluid communication with the second working chamber and an outlet of the second control valve is in fluid communication with the collector chamber. The damper further includes a first check valve disposed within the first control valve. The first check valve is operable to allow flow of fluid from the collector chamber to the outer chamber. The damper also includes a second check valve disposed within the second control valve. The second check valve is operable to allow flow of fluid from the collector chamber to the second working chamber.

Other features and aspects of this disclosure will be apparent from the following description and the accompanying drawings.

DETAILED DESCRIPTION

Wherever possible, the same reference numbers will be used throughout the drawings to refer to same or like parts.

The term "substantially perpendicular", as used herein, means that two components are perpendicular to each other with an acceptable degree of variation, for example, less than 5% of 90 degrees. The variation may be due to manufacturing tolerance.

Figure 1:
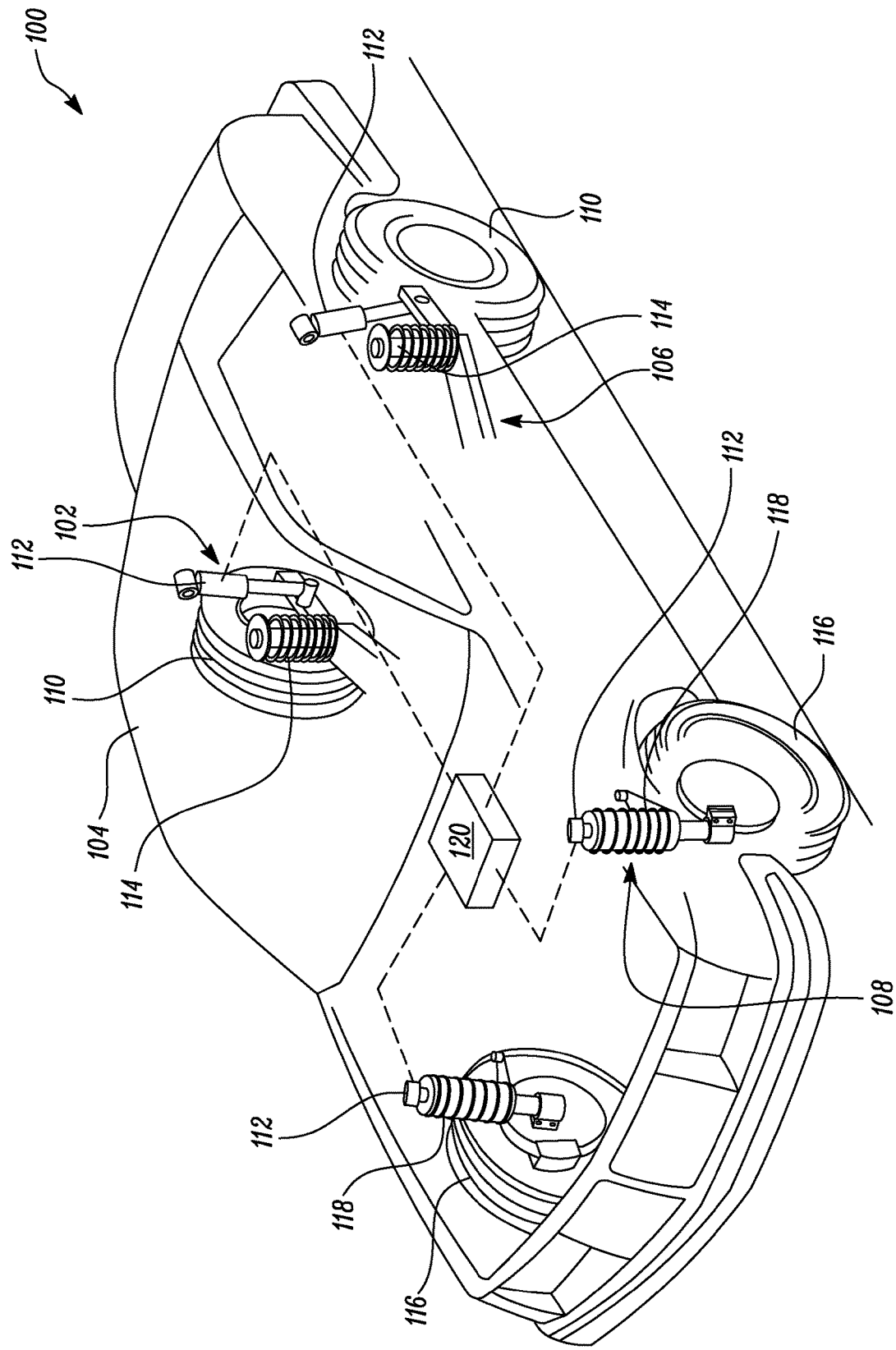
FIG. 1 is an illustration of a vehicle incorporating a suspension system, according to an aspect of the present disclosure.

FIG. 1 illustrates an exemplary vehicle 100 incorporating a suspension system 102 in accordance with the present disclosure. The vehicle 100 may include a vehicle driven by an internal combustion engine, an electric vehicle, or a hybrid vehicle. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) which operatively supports a pair of front wheels 116. The front axle assembly is operatively connected to the body 104 by means of another pair of the dampers 112 and a pair of helical coil springs 118. In an alternative embodiment, the vehicle 100 may include an independent suspension unit (not shown) for each of the four corners instead of front and rear axle assemblies.

The dampers 112 of the suspension system 102 serve to damp the relative movement of the unsprung portion (i.e., the front and rear suspensions 108, 106) and the sprung portion (i.e., the body 104) of the vehicle 100. While the vehicle 100 has been depicted as a passenger car, the dampers 112 may be used with other types of vehicles 100. Examples of such vehicles 100 include buses, trucks, off-road vehicles 100, and so forth. Furthermore, the term "damper 112" as used herein will refer to dampers 112 in general and will include shock absorbers, McPherson struts, and semi-active and active suspensions.

In order to automatically adjust each of the dampers 112, an electronic controller 120 (hereinafter referred to as "the controller 120") is electrically connected to the dampers 112. The controller 120 is used for controlling an operation of each of the dampers 112 in order to provide appropriate damping characteristics resulting from movements of the body 104 of the vehicle 100. Further, the controller 120 may independently control each of the dampers 112 in order to independently control a damping level of each of the dampers 112. The controller 120 may be electrically connected to the dampers 112 via wired connections, wireless connections, or a combination thereof.

The controller 120 may independently adjust the damping level or characteristic of each of the dampers 112 to optimize a riding performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Such adjustments of the damping levels may be beneficial during braking and turning of the vehicle 100. In an embodiment, the controller 120 may process input signals from one or more sensors of the vehicle 100 in order to control the damping level of each of the dampers 112. The sensors may sense one or more parameters of the vehicle 100, such as, but not limited to, displacement, velocity, acceleration, vehicle speed, steering wheel angle, brake pressure, engine torque, engine revolutions per minute (RPM), throttle pedal position, and so forth. The controller 120 may further control the damping level of the dampers 112 based on a driving mode of the vehicle 100. The driving mode may include a sport mode or a comfort mode. A button (not shown) may allow a driver of the vehicle 100 to choose the driving mode of the vehicle 100. The controller 120 may receive input signals based on an actuation of the button and control the dampers 112 accordingly.

In another embodiment, the controller 120 may control the damping level of each of the dampers 112 based on external road conditions, such as rain, snow, mud, and the like. In a further embodiment, the controller 120 may also regulate the damping level of each of the dampers 112 based on internal vehicle conditions, such as a fuel level, occupancy of the vehicle, and so forth.

While the present disclosure is being illustrated with a single controller 120, it is within the scope of the present disclosure to utilize a dedicated electronic controller 120 for each of the dampers 112. The dedicated electronic controller 120 may be located onboard the respective damper 112. The controller 120 may be an Electronic Control Unit (ECU) of the vehicle 100. The controller 120 may include a processor, a memory, Input/Output (I/O) interfaces, communication interfaces, and other components. The processor may execute various instructions stored in the memory for carrying out various operations of the controller 120. The controller 120 may receive and transmit signals and data through the I/O interfaces and the communication interfaces. In further embodiments, the controller 120 may include microcontrollers, application-specific integrated circuits (ASICs), field programmable gate arrays (FPGAs), and so forth.

Figure 2:
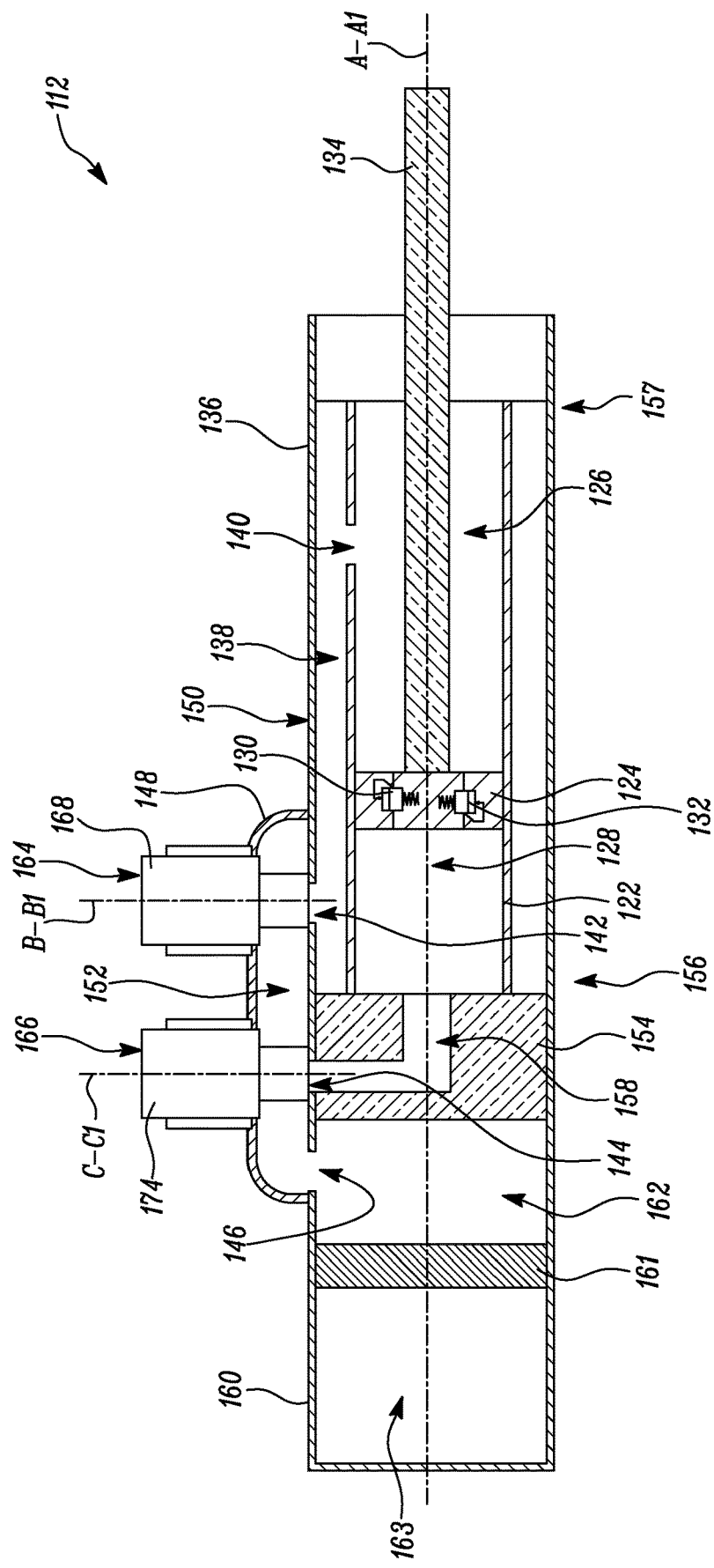
FIG. 2 is an illustration of a damper associated with the suspension system of FIG. 1, according to an aspect of the present disclosure.

FIG. 2 illustrates a schematic view of the damper 112. The damper 112 may be any of the four dampers 112 of the vehicle 100. The damper 112 may include a Continuously Variable Semi-Active Suspension system (CVSA2) damper 112 or a shock absorber, without any limitations. The damper 112 may contain a fluid which can be a hydraulic fluid or oil. The damper 112 includes an inner tube 122. The inner tube 122 defines a longitudinal axis "A-A1". The inner tube 122 defines a lower end 156 and an upper end 157. A piston 124 is slidably disposed within the inner tube 122. The piston 124 defines a first working chamber 126 and a second working chamber 128 within the inner tube 122. Each of the first and second working chambers 126, 128 contain the fluid therein. The first working chamber 126 is a rebound chamber and the second working chamber 128 is a compression chamber. A volume of the first and second working chambers 126, 128 vary based on a reciprocating motion of the piston 124.

Additionally, a pair of piston valves 130, 132 are disposed within the piston 124 to regulate fluid flow between the first working chamber 126 and the second working chamber 128. More particularly, the piston valves 130, 132 maintain desired pressures in each of the first and second working chambers 126, 128 and open in case of a pressure surge in one of the first and second working chambers 126, 128. Although two piston valves 130, 132 are described herein, the damper 112 may include a single piston valve, without any limitations. Further, the damper 112 includes a rod 134. One end of the rod 134 is connected to the piston 124 and reciprocates with the piston 124 whereas another end of the rod is connected to the body 104 of the vehicle 100. The damper 112 also includes an outer tube 136 disposed around the inner tube 122. In some embodiments, the outer tube 136 is concentrically disposed around the inner tube 122. The outer tube 136 defines an outer chamber 138. The outer chamber 138 is disposed between the inner tube 122 and the outer tube 136. The outer chamber 138 is in fluid communication with the first working chamber 126 via a first passage 140. Additionally, the outer tube 136 defines a first opening 142, a second opening 144, and a third opening 146.

Figure 4:
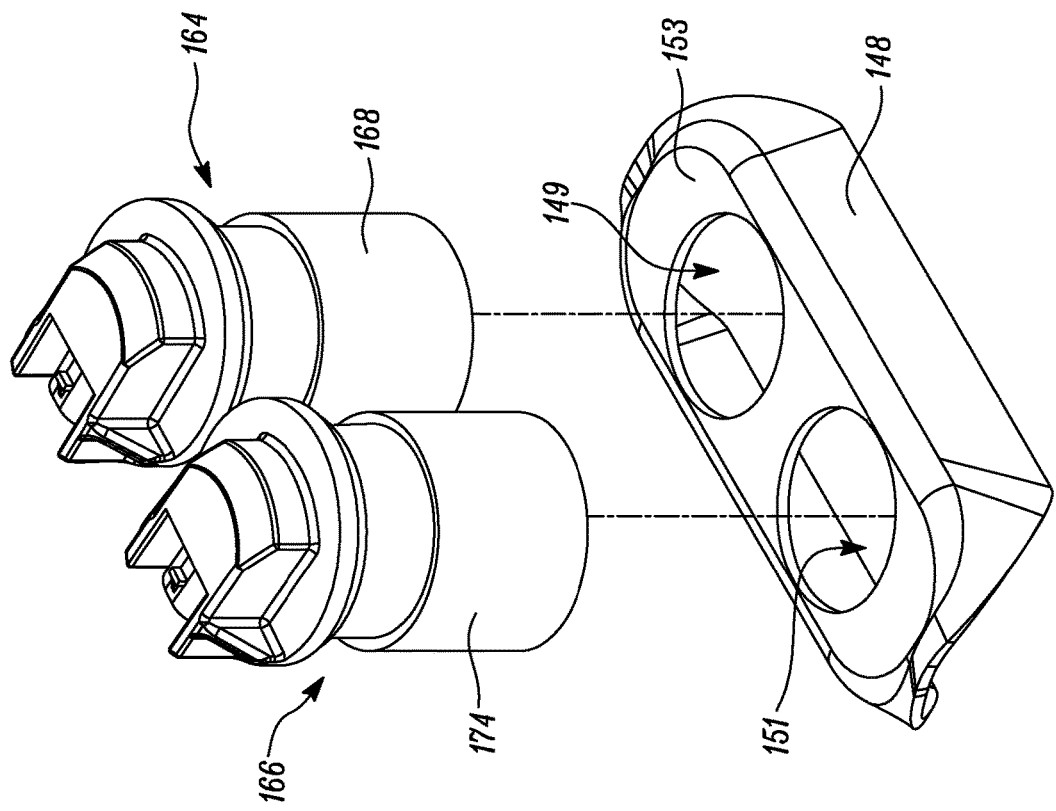
FIG. 4 is a disassembled view of a cover member, a first control valve, and a second control valve of the damper shown in FIG. 2.

Further, the damper 112 includes a cover member 148. The cover member 148 is embodied as a stamped hollow housing. The cover member 148 is mounted on an outer surface 150 of the outer tube 136. The cover member 148 may be used as a collector for low pressure channels. Further, the cover member 148 may allow hydraulic interconnections within the damper 112 in a more cost-effective way thereby eliminating any requirement of a valve block to achieve the same hydraulic interconnections. The cover member 148 may be a low-cost component that is manufactured using a suitable manufacturing technique. Further, the cover member 148 may not include any complex passageways or channels to establish hydraulic interconnections within the damper 112, thereby allowing simplified hydraulic interconnections. In one example, the cover member 148 may be welded to the outer surface 150 of the outer tube 136. In another example, the cover member 148 may be coupled to the outer surface 150 of the outer tube 136 using mechanical fasteners, such as bolts. The cover member 148 defines a collector chamber 152 between the outer tube 136 and the cover member 148. The collector chamber 152 is in fluid communication with the outer tube 136 via the first opening 142 of the outer tube 136. Further, the cover member 148 defines a first aperture 149 (shown in FIG. 4) and a second aperture 151 (shown in FIG. 4). The first and second apertures 149, 151 are provided in an upper surface 153 (shown in FIG. 4) of the cover member 148.

The damper 112 also includes an end member 154. The end member 154 is disposed at the lower end 156 of the inner tube 122. The end member 154 defines a second passage 158. The second passage 158 allows fluid communication between the second working chamber 128 and the second opening 144 of the outer tube 136. As illustrated, the damper 112 includes an accumulator 160. In the illustrated example of FIG. 2, the accumulator 160 is a piston accumulator. Alternatively, the accumulator 160 may include a bladder accumulator, without any limitations. In the illustrated example, the accumulator 160 is disposed within the outer tube 136. The accumulator 160 defines an accumulator chamber 162 containing the fluid therein. The accumulator chamber 162 is in fluid communication with the collector chamber 152 via the third opening 146 of the outer tube 136. Further, the accumulator 160 includes a gas chamber 163. The gas chamber 163 is sealably separated from the accumulator chamber 162 by a floating piston 161. It should be noted that the gas chamber 163 holds a gas in a compressed form therein.

Figure 3:
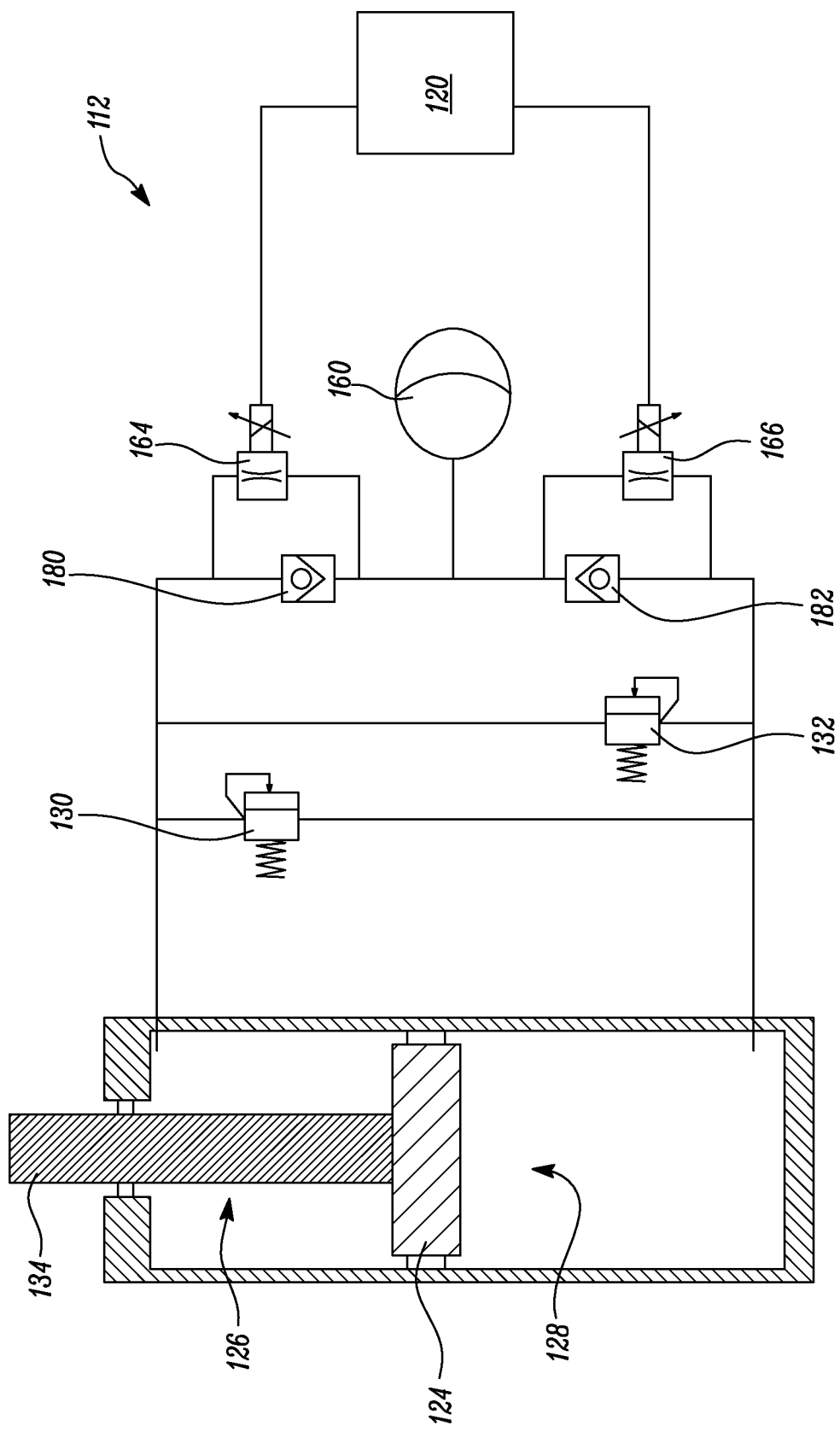
FIG. 3 is an illustration of a hydraulic circuit of the damper shown in FIG. 2.

FIG. 3 illustrates a hydraulic circuit of the damper 112. As shown, the damper 112 includes a first control valve 164 and a second control valve 166. The first and second control valves 164, 166 are electro-hydraulic valves. In one example, each of the first and second control valves 164, 166 may be a two-position solenoid valve. The controller 120 may regulate the first and second control valves 164, 166 in order to control the damping level of the damper 112. The first and second control valves 164, 166 may be controlled by an input current provided to respective solenoids (not shown) of the first and second control valves 164, 166. The controller 120 generates the input current in order to control the operation and the damping level of the damper 112. The solenoids of the corresponding first and second control valves 164, 166 may be in electrical communication with the controller 120. Further, the input current may vary between lower and upper limits, which correspond to least and most restrictive positions (i.e., an open position and a closed position) of the first and second control valves 164, 166, respectively. The controller 120 may control the damping force or level by controlling a degree of restriction of the first and second control valves 164, 166. Specifically, the controller 120 may regulate the input currents to vary a restriction of the corresponding first and second control valves 164, 166. A low current to the corresponding first and second control valves 164, 166 may correspond to low damping ratio or damping level. Similarly, a high current to the corresponding first and second control valves 164, 166 may correspond to a high damping ratio or damping level.

During a rebound stroke of the damper 112, the first control valve 164 is operable to regulate fluid flow from the outer chamber 138 to the collector chamber 152 in response to a motion of the piston 124 towards the first working chamber 126. Thus, the first control valve 164 is in the open position during the rebound stroke of the damper 112 to control rebound damping characteristics of the damper 112. Specifically, a degree of opening of the first control valve 164 may be regulated to adjust the rebound damping characteristics of the damper 112. Further, during a compression stroke, the first control valve 164 is operable to prevent fluid flow therethrough in response to a motion of the piston 124 towards the second working chamber 128. Thus, the first control valve 164 is in the closed position during the compression stroke of the damper 112.

Figure 5:
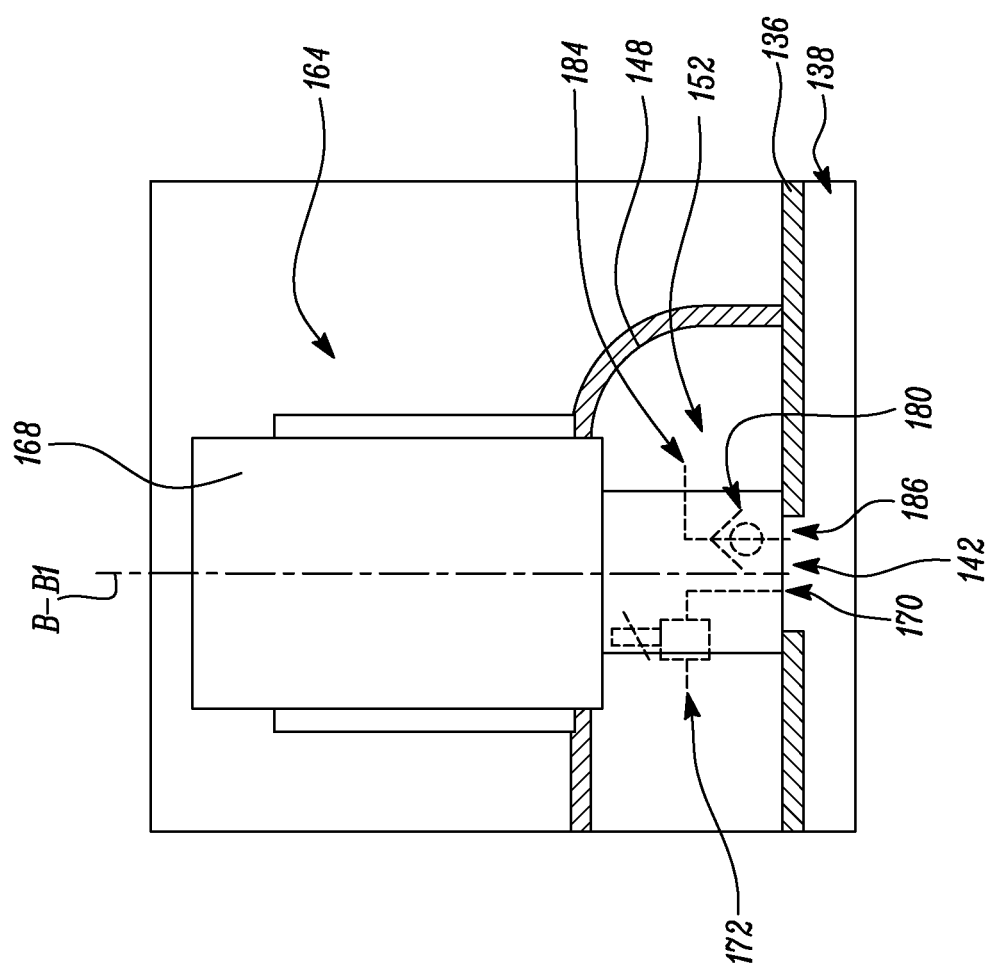
FIG. 5 is an illustration of a first control valve associated with the damper of FIG. 2, according to an aspect of the present disclosure.

Referring to FIG. 2, the first control valve 164 is mounted on the cover member 148. More particularly, the first control valve 164 includes a first valve housing 168. The first valve housing 168 defines a first valve axis "B-B1". The first valve axis "B-B1" is defined as a longitudinal axis of the first valve housing 168. The first valve axis "B-B1" is substantially perpendicular to the longitudinal axis "A-A1" of the inner tube 122. A portion of the first valve housing 168 is received within the cover member 148 through the first aperture 149 of the cover member 148. In one example, the first valve housing 168 may be welded to the cover member 148 at the first aperture 149. In another example, the first valve housing 168 may be coupled to the cover member 148 using mechanical fasteners, such as bolts. Though the first aperture 149 is illustrated as a circular aperture in FIG. 4, a shape and dimensions of the first aperture 149 may be based on a shape and dimensions of the portion of the first valve housing 168 that is received through the first aperture 149. As shown in FIG. 5, the first control valve 164 includes an inlet 170 and an outlet 172. The inlet 170 of the first control valve 164 is in fluid communication with the outer chamber 138 (see FIG. 2). In the open position, the first control valve 164 allows fluid communication between the outer chamber 138 and the collection chamber 152. More particularly, the inlet 170 is in fluid communication with the first opening 142 to allow selective fluid communication between the first working chamber 1126 and the second working chamber 128, via the first control valve 164 in order to regulate the fluid flow from the first working chamber 126 to the second working chamber 128. Further, the outlet 172 of the first control valve 164 is in fluid communication with the collector chamber 152.

Figure 6:
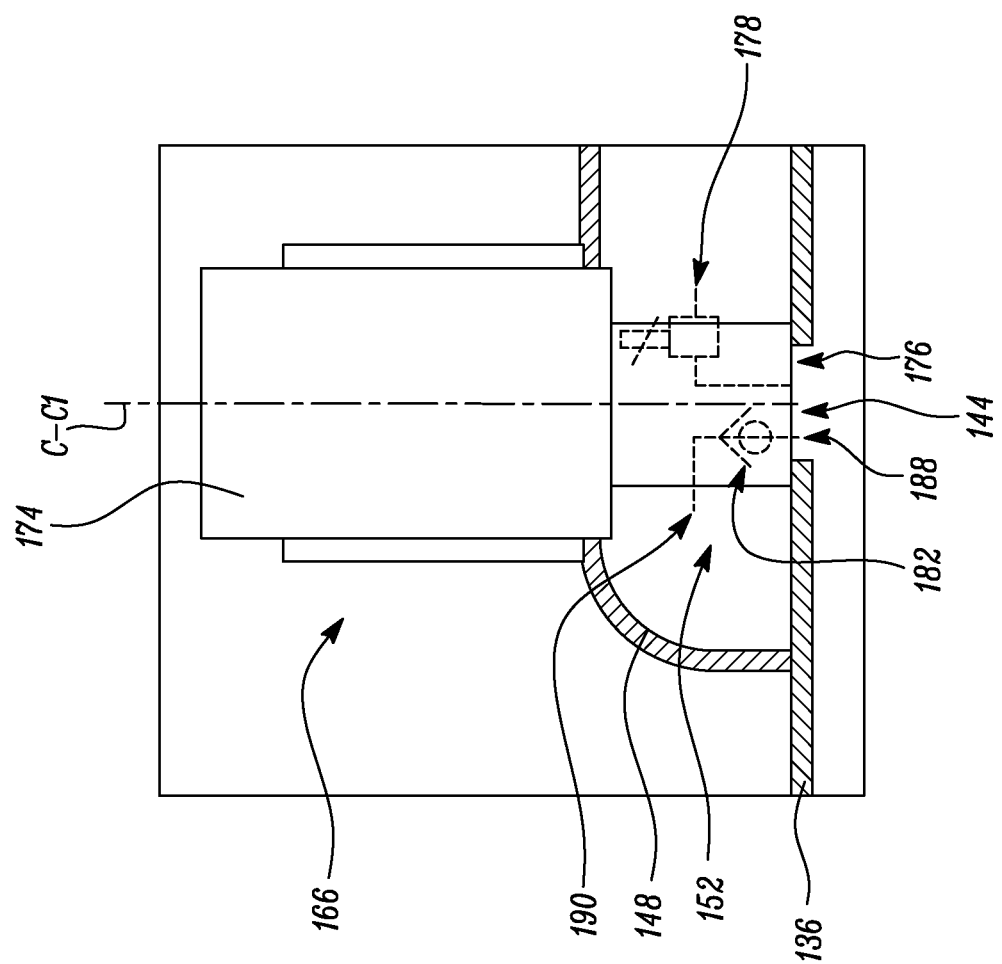
FIG. 6 is an illustration of a second control valve associated with the damper of FIG. 2, according to an aspect of the present disclosure.

Referring to FIG. 6, the damper 112 also includes the second control valve 166. During the compression stroke of the damper 112, the second control valve 166 is operable to regulate fluid flow from the second working chamber 128 to the collector chamber 152 in response to the motion of the piston 124 towards the second working chamber 128. Thus, the second control valve 166 is in the open position during the compression stroke of the damper 112 to control compressive damping characteristics of the damper 112. Specifically, a degree of opening of the second control valve 166 may be regulated to adjust the compressive damping characteristics of the damper 112. Further, during the compression stroke, the second control valve 166 is operable to prevent fluid flow therethrough in response to the motion of the piston 124 towards the first working chamber 126. More particularly, the second control valve 166 is in the closed position during the rebound stroke of the damper 112.

The second control valve 166 is mounted on the cover member 148 and is spaced apart from the first control valve 164 (see FIG. 2). More particularly, the second control valve 166 includes a second valve housing 174. The second valve housing 174 defines a second valve axis "C-C1". The second valve axis "C-C1" is defined as a longitudinal axis of the second valve housing 174. The second valve axis "C-C1" is substantially parallel to the first valve axis "B-B1". Further, the second valve axis "C-C1" is substantially perpendicular to the longitudinal axis "A-A1" of the inner tube 122. Moreover, a portion of the second valve housing 174 is received within the cover member 148 through the second aperture 151 of the cover member 148. In one example, the second valve housing 174 of the second control valve 166 may be welded to the cover member 148 at the second aperture 151. In another example, the second valve housing 174 of the second control valve 166 may be coupled to the cover member 148 using mechanical fasteners, such as bolts. Though the second aperture 151 is illustrated as a circular aperture in FIG. 4, a shape and dimensions of the second aperture 151 may be based on a shape and dimensions of the portion of the second valve housing 174 that is received through the second aperture 151. The second control valve 166 includes an inlet 176 and an outlet 178. The inlet 176 of the second control valve 166 is in fluid communication with the second working chamber 128 (see FIG. 2). More particularly, the inlet 176 is in fluid communication with the second opening 144 and the second passage 158 (see FIG. 2) to allow selective fluid communication between the second working chamber 128 and the accumulator 160, via the second control valve 166 in order to regulate the fluid flow from the second working chamber 128 to the accumulator 160. Further, the outlet 178 of the second control valve 166 is in fluid communication with the collector chamber 152.

As shown in FIG. 5, the damper 112 includes a first check valve 180. The first check valve 180 may be a passive valve. The first check valve 180 is operable to allow flow of fluid from the collector chamber 152 to the outer chamber 138. In the illustrated example, the first check valve 180 is disposed within the first control valve 164. In another example, the first check valve 180 may be disposed within the cover member 148 (shown in FIG. 11). An inlet 184 of the first check valve 180 is in fluid communication with the collector chamber 152 and an outlet 186 is in fluid communication with the outer chamber 138 (see FIG. 2). The first check valve 180 may allow unidirectional flow of fluid from the collector chamber 152 to the outer chamber 138. The first check valve 180 is in an open position during the compression stroke of the damper 112 and in a closed position during the rebound stroke. In the open position, the first check valve 180 allows fluid flow from the collector chamber 152 to the outer chamber 138. More particularly, during the compression stroke, a volume of the first working chamber 126 (see FIG. 2) increases as the piston 124 (see FIG. 2) moves towards the second working chamber 128 (see FIG. 2). Thus, the first check valve 180 provides a compensating fluid flow from the second working chamber 128 to the first working chamber 126 via the outer chamber 138 to increase an amount of fluid in the first working chamber 126. More particularly, as the volume of rod 134 in the first working chamber 126 increases, the compensating fluid flow from the second working chamber 128 to the first working chamber 126 increases an amount of the fluid in the first working chamber 126.

As shown in FIG. 6, the damper 112 includes a second check valve 182. The second check valve 182 may be a passive valve. The second check valve 182 is operable to allow flow of fluid from the collector chamber 152 to the second working chamber 128. In the illustrated example, the second check valve 182 is disposed within the second control valve 164. Alternatively, the second check valve 182 may be disposed within the cover member 148 (shown in FIG. 11). An inlet 188 of the second check valve 182 is in fluid communication with the collector chamber 152 and an outlet 190 is in fluid communication with the second working chamber 128 (see FIG. 2). The first check valve 180 may allow unidirectional flow of fluid from the collector chamber 152 to the second working chamber 128. The second check valve 182 is in an open position during the rebound stroke of the damper 112 and is in a closed position during the compression stroke. During the rebound stroke of the damper 112, the second check valve 182 allows fluid flow from the collector chamber 152 to the second working chamber 128. More particularly, during the rebound stroke, a volume of the second working chamber 128 increases as the piston 124 (see FIG. 2) moves towards the first working chamber 126 (see FIG. 2). Thus, the second check valve 182 provides a compensating fluid flow from the first working chamber 126 towards the second working chamber 128 to increase an amount of fluid in the second working chamber 128. More particularly, as the volume of rod 134 in the first working chamber 126 decreases, the compensating fluid flow from first working chamber 126 to the second working chamber 128 increases an amount of the fluid in the second working chamber 128.

Figure 7:
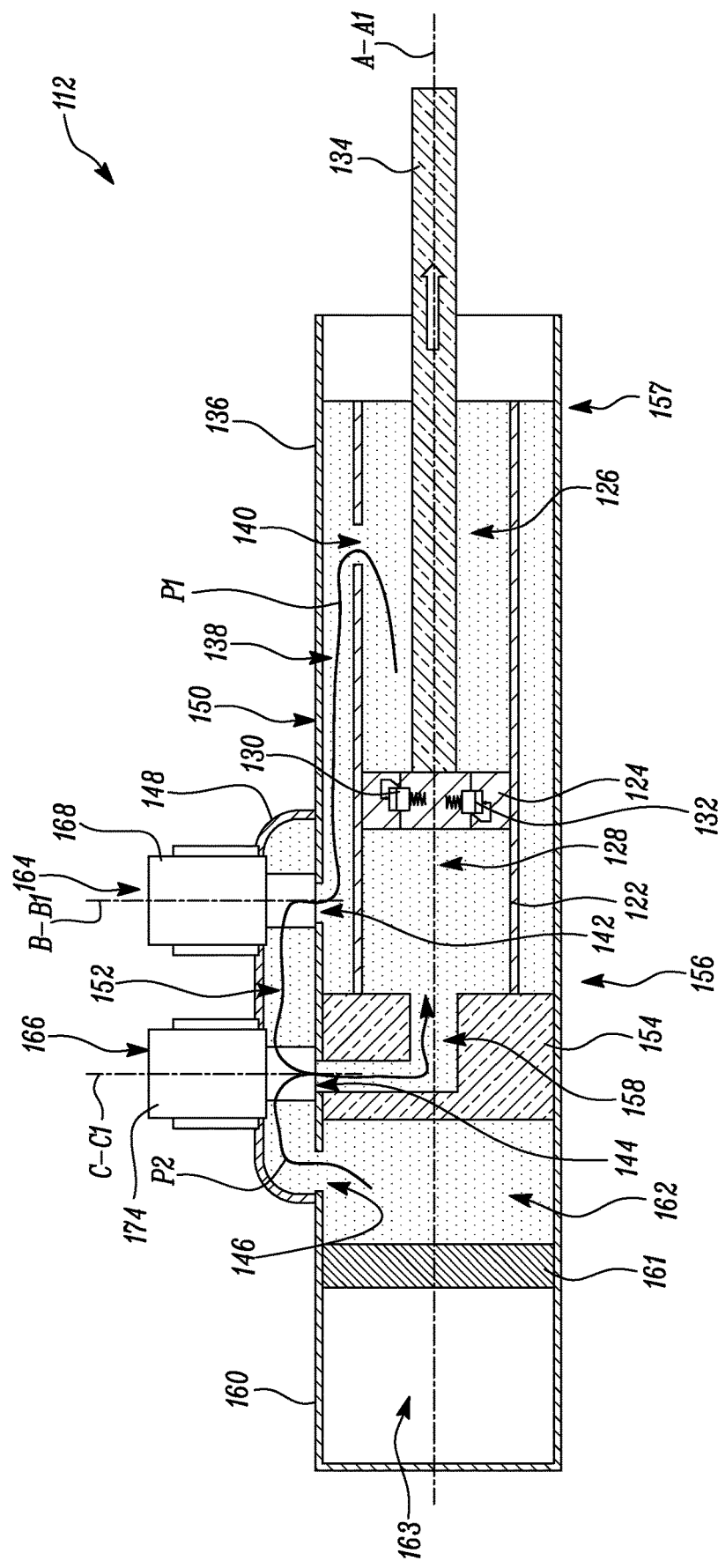
FIG. 7 is an illustration of the damper shown in FIG. 2 during a rebound stroke.

An operation of the damper 112 during the rebound and compression strokes will now be explained in detail with reference to FIGS. 7 and 8. Referring to FIG. 7, in the rebound stroke, when the piston 124 moves towards the first working chamber 126, a volume of the rod 134 inside the first working chamber 126 reduces and a volume of the second working chamber 128 increases. Thus, an additional flow of fluid is directed to the second working chamber 128 to compensate for the increase in the volume of the second working chamber 128. The second working chamber 128 may receive the fluid partly from the accumulator 160 and partly from the first working chamber 126. More particularly, based on the movement of the piston 124 towards the first working chamber 126, the fluid flows from the first working chamber 126 towards the outer chamber 138 via the first passage 140. Further, as the first control valve 164 is in the open position during the rebound stroke, the fluid flows through the first control valve 164 and is received within the collector chamber 152 of the cover member 148. In order to increase the amount of fluid in the second working chamber 128, some portion of the fluid from the collector chamber 152 is introduced in the second working chamber 128. Path "P1" depicts the fluid flow from the first working chamber 126 towards the second working chamber 128. Further, the compensating fluid to the second working chamber 128 may at least partly be provided by the fluid flow from the first working chamber 126 to the collector chamber 152 via the outer chamber 138.

Further, during the rebound stroke, there is a net flow of fluid from the accumulator 160 to the collector chamber 152 as the volume of the rod 134 in the first working chamber 126 decreases. More particularly, as the second check valve 182 is in the open position, the second check valve 182 allows a portion of the fluid in the collector chamber 152 to flow into the second working chamber 128 thereby providing the compensating fluid flow to the second working chamber 128. During the rebound stroke, the compensating fluid flow to the second working chamber 128 may at least partly be provided by the fluid flow from the accumulator chamber 162 to the collector chamber 152. Path "P2" depicts the fluid flow from the accumulator 160 towards the second working chamber 128.

Figure 8:
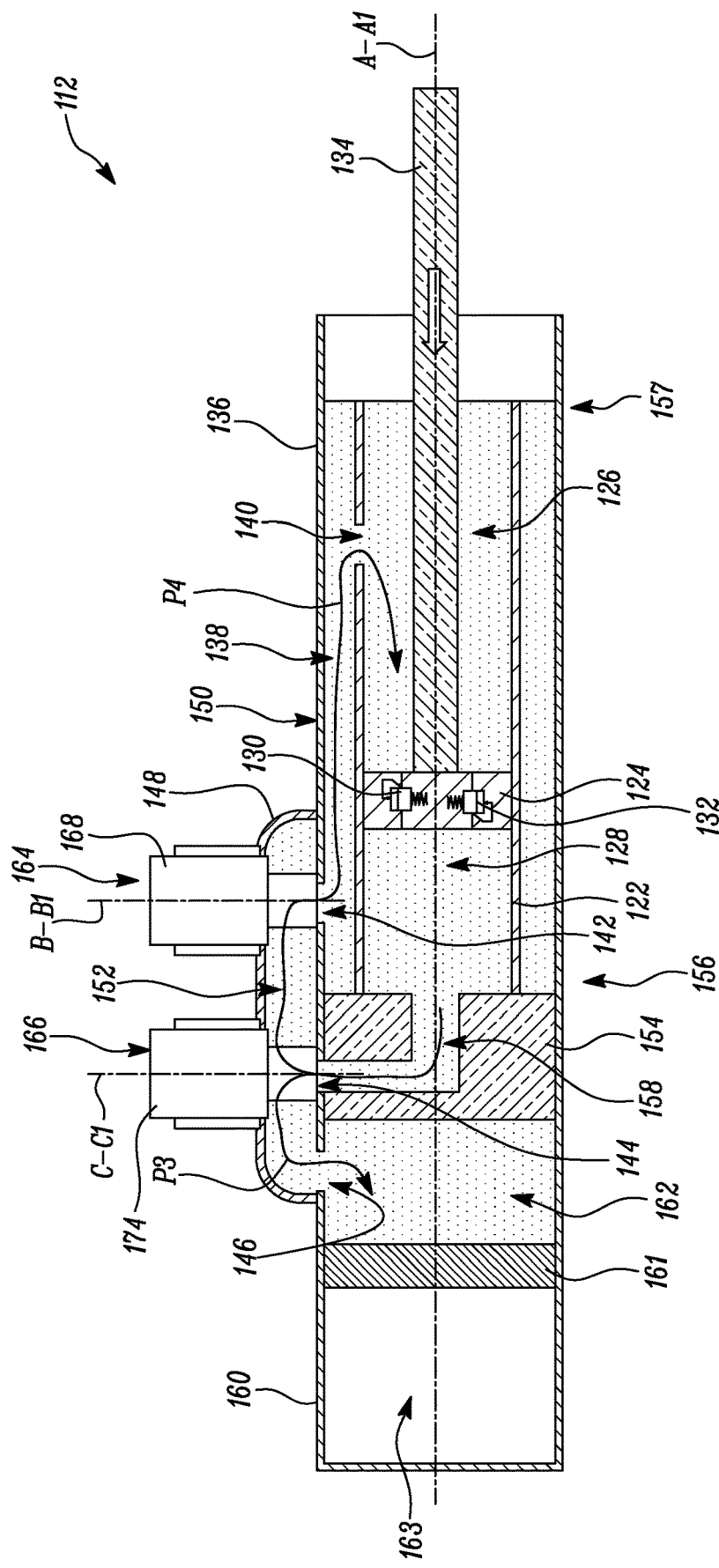
FIG. 8 is an illustration of the damper shown in FIG. 2 during a compression stroke.

Referring now to FIG. 8, during the compression stroke, when the piston 124 moves towards the second working chamber 128, the volume of the rod 134 inside the first working chamber 126 increases and the volume of the second working chamber 128 decreases. Thus, an additional flow of fluid is directed to the first working chamber 126 to compensate for the increase in the volume of the first working chamber 126. Further, during the compression stroke, there is a net flow of fluid from the second working chamber 128 to the accumulator 160 as the volume of the rod 134 in the first working chamber 126 increases. More particularly, based on the movement of the piston 124 towards the first working chamber 126, the fluid flows from the second working chamber 128 towards the second passage 158. Further, as the second control valve 166 is in the open position during the compression stroke, the fluid flows through the second control valve 166 and is received within the collector chamber 152 of the cover member 148. From the collector chamber 152, some portion of the fluid may flow to the accumulator 160. Path "P3" depicts the fluid flow from the second working chamber 128 towards the collector chamber 152, and eventually to the accumulator chamber 162. Additionally, the first check valve 180 is in the open position. Thus, the first check valve 180 allows some portion of the fluid from the collector chamber 152 to flow into the outer chamber 138 thereby providing the compensating fluid flow from the second working chamber 128 towards the first working chamber 126 via the outer chamber 138. Path "P4" depicts the fluid flow from the second working chamber 128 towards the first working chamber 126.

Figure 9:
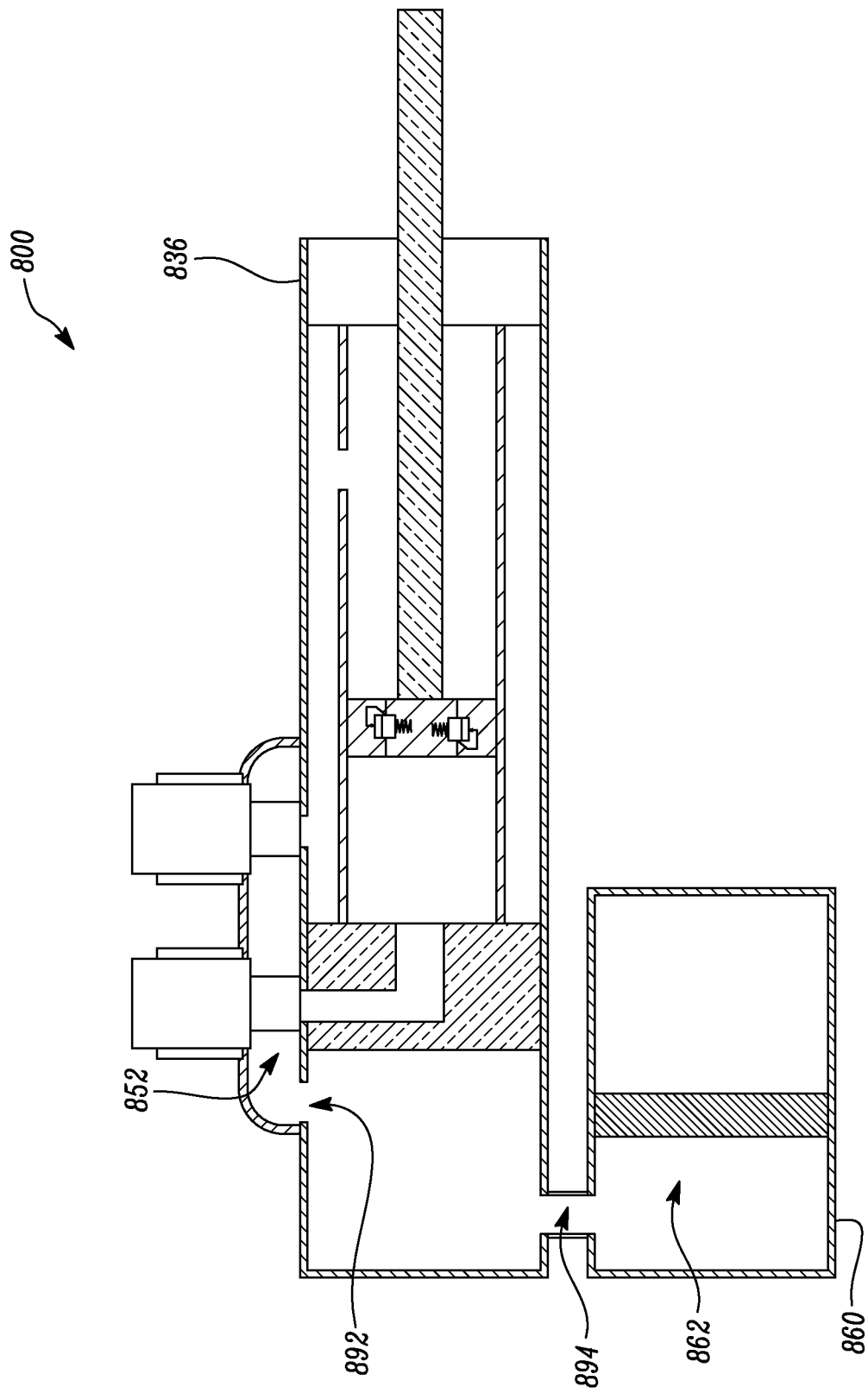
FIG. 9 is an illustration of another design of a damper associated with the suspension system of FIG. 1, according to an aspect of the present disclosure.

FIG. 9 illustrates another design of a damper 800. Components and working of the damper 800 are substantially similar to components and working of the damper 112 described in FIGS. 2 to 8. Further, in this design of the damper 800, an accumulator 860 of the damper 800 is disposed externally with respect to an outer tube 836. The accumulator 860 defines an accumulator chamber 862. The accumulator chamber 862 is in fluid communication with a collection chamber 852 of the damper 800 by a fourth opening 892 in the outer tube 836 and a third passage 894.

Figure 10:
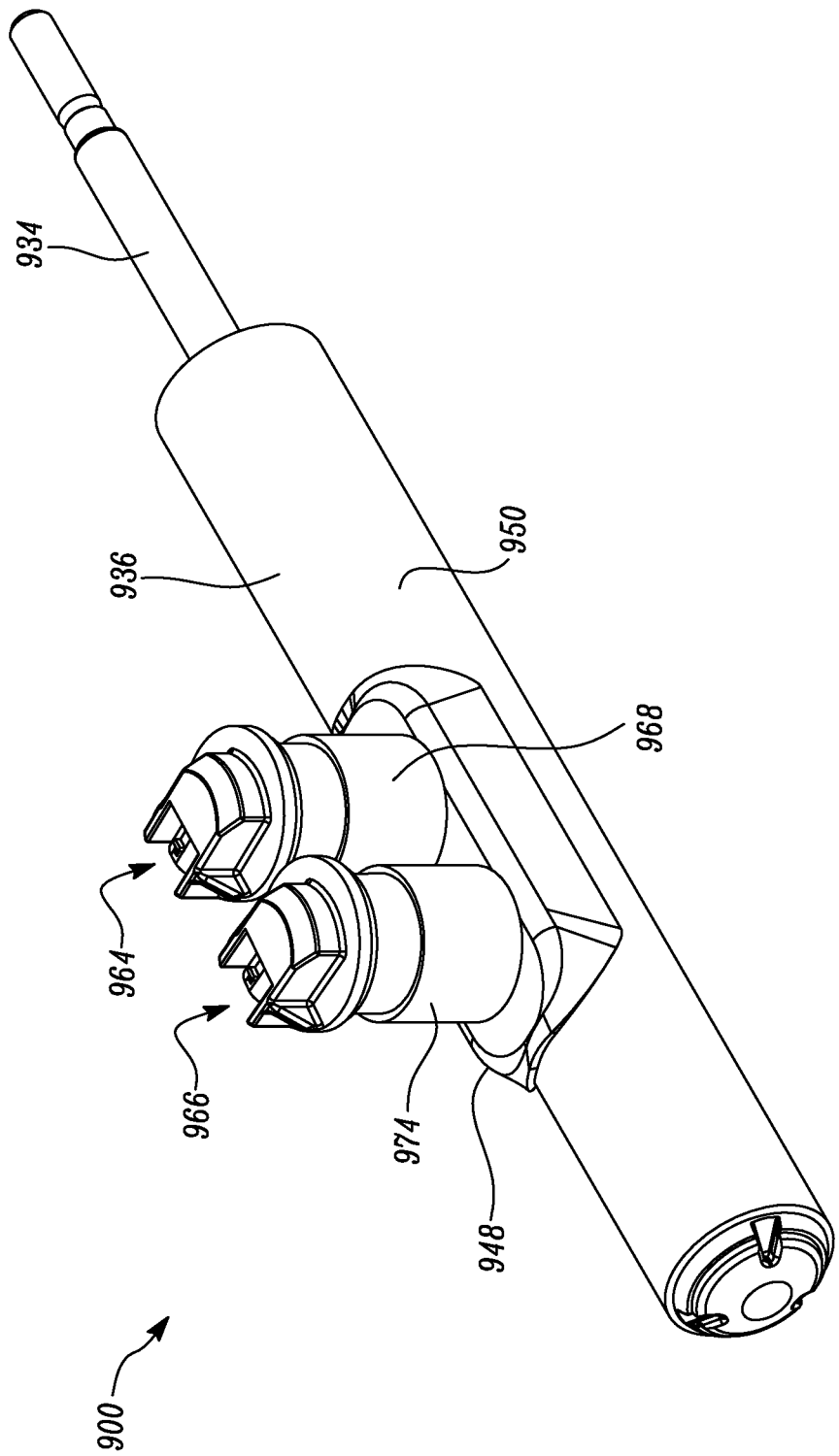
FIG. 10 is a perspective view of yet another design of a damper associated with the suspension system of FIG. 1, according to an aspect of the present disclosure.
Figure 11:
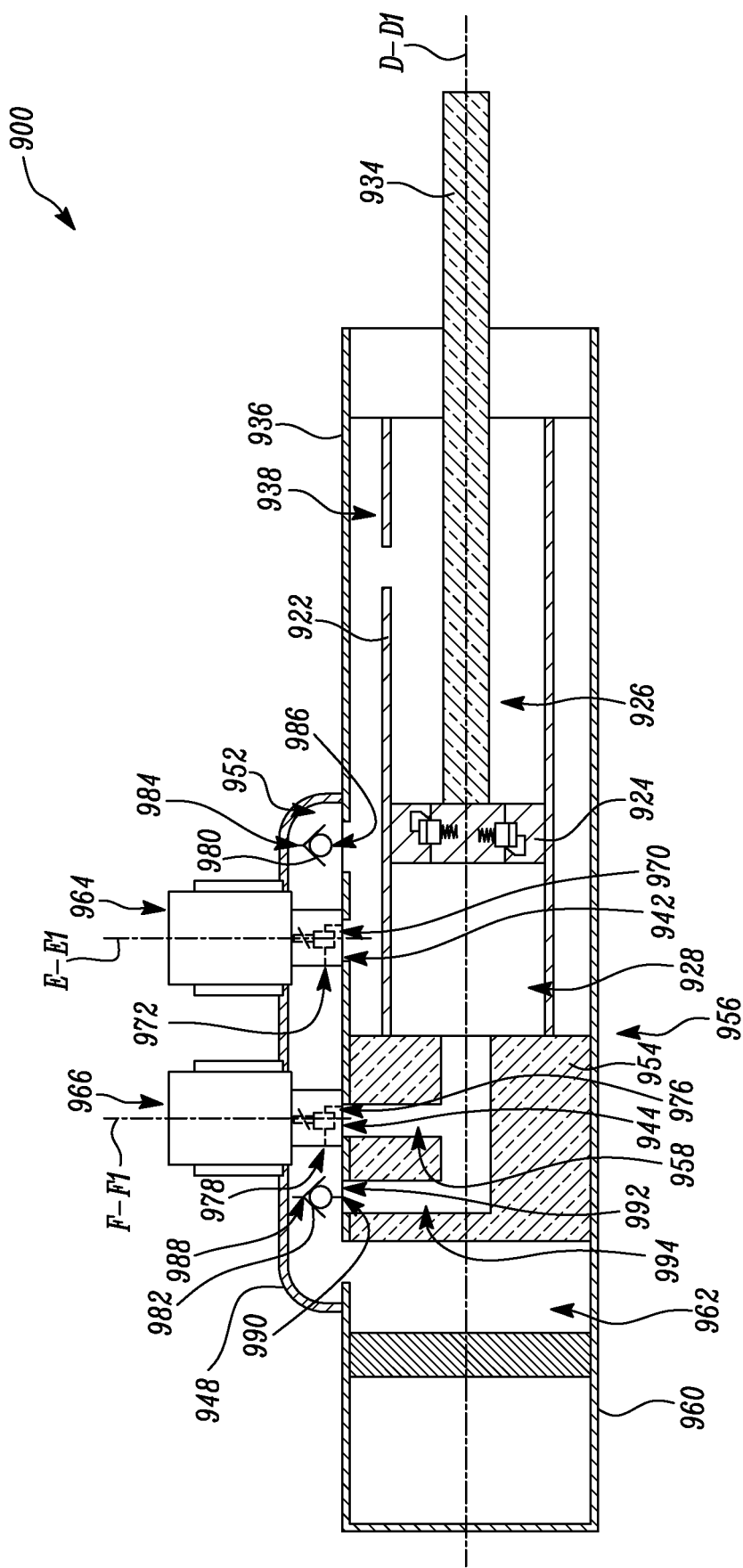
FIG. 11 is an illustration of the damper shown in FIG. 10, according to an aspect of the present disclosure.

FIGS. 10 and 11 illustrate yet another design of a damper 900. Components and working of the damper 900 are substantially similar to components and working of the damper 112 described in FIGS. 2 to 8. The damper 900 may contain a fluid which can be a hydraulic fluid or oil. Referring to FIG. 11, the damper 900 includes an inner tube 922 and a piston 924 that is slidably disposed within the inner tube 922. The inner tube 122 defines a longitudinal axis "D-D1". The piston 924 defines a first working chamber 926 and a second working chamber 928 within the inner tube 922. Each of the first and second working chambers 926, 928 contain the fluid therein. Further, the damper 900 includes a rod 934. One end of the rod 934 is connected to the piston 924 and reciprocates with the piston 924 whereas another end of the rod 934 is connected to the body 104 (see FIG. 1) of the vehicle 100 (see FIG. 1).

The damper 900 also includes an outer tube 936. The outer tube 936 is disposed around the inner tube 922. In some embodiments, the outer tube 936 is concentrically disposed around the inner tube 922. The outer tube 936 defines an outer chamber 938. The outer chamber 938 is disposed between the inner tube 922 and the outer tube 936. The outer chamber 938 is in fluid communication with the first working chamber 926. Further, the damper 900 includes a cover member 948. The cover member 948 is mounted on an outer surface 950 (see FIG. 10) of the outer tube 936. In one example, the cover member 948 is welded to the outer surface 950 of the outer tube 936. The cover member 948 defines a collector chamber 952 between the outer tube 936 and the cover member 948. As illustrated, the damper 900 also includes an accumulator 960. The accumulator 960 defines an accumulator chamber 962 containing the fluid therein. The accumulator chamber 962 is in fluid communication with the collector chamber 952. Further, an end member 954 is disposed at a lower end 956 of the inner tube 922. The end member 954 defines a first passage 958 that fluidly communicates the second working chamber 928 with a second opening 944 of the outer tube 936.

Further, the damper 900 includes a first control valve 964 and a second control valve 966. The first control valve 964 is mounted on the cover member 948. More particularly, the first control valve 964 includes a first valve housing 968 (see FIG. 10). The first valve housing 968 defines a first valve axis "E-E1". The first valve axis "E-E1" is defined as a longitudinal axis of the first valve housing 968. The first valve axis "E-E1" is substantially perpendicular to the longitudinal axis "D-D1" of the inner tube 922. A portion of the first valve housing 968 is received within the cover member 948. In one example, the first valve housing 968 may be welded to the cover member 948. The first control valve 964 includes an inlet 970 and an outlet 972. The inlet 970 of the first control valve 964 is in fluid communication with the outer chamber 938, via a first opening 942. Further, the outlet 972 of the first control valve 964 is in fluid communication with the collector chamber 952.

The second control valve 966 includes an inlet 976 and an outlet 978. Further, the second control valve 966 is mounted on the cover member 948. More particularly, the second control valve 966 includes a second valve housing 974 (shown in FIG. 10). The second valve housing 974 defines a second valve axis "F-F1". The second valve axis "F-F1" is defined as a longitudinal axis of the second valve housing 974. The second valve axis "F-F1" is substantially parallel to the first valve axis "E-E1". Further, the second valve axis "F-F1" is substantially perpendicular to the longitudinal axis "D-D1" of the inner tube 922. A portion of the second valve housing 974 is received within the cover member 948. In one example, the second valve housing 974 of the second control valve 966 may be welded to the cover member 948. The inlet 976 of the second control valve 966 is in fluid communication with the second working chamber 928, via a second opening 944. Further, the outlet 978 of the second control valve 966 is in fluid communication with the collector chamber 952. In this design of the damper 900, a first check valve 980 of the damper 900 is positioned within the cover member 948. The first check valve 980 is operable to allow flow of fluid from the collector chamber 952 to the outer chamber 938. An inlet 984 of the first check valve 980 is in fluid communication with the collector chamber 952 and an outlet 986 is in fluid communication with the outer chamber 938.

Further, a second check valve 982 is positioned within the cover member 948. The second check valve 982 is operable to allow flow of fluid from the collector chamber 952 to the second working chamber 928. An inlet 988 of the second check valve 982 is in fluid communication with the collector chamber 952. Further, an outlet 990 of the second check valve 982 is in fluid communication with the second working chamber 928 via a fifth opening 992 and a fifth passage 994. It should be noted that an operation of the first and second control valves 964, 966 and the first and second check valves 980, 982 is substantially similar to the first and second control valves 164, 166 and the first and second check valves 180, 182, respectively, described in relation to FIGS. 5 and 6. Further, the dampers 112, 800, 900 described herein can be manufactured at a lower cost as compared to existing damper designs. Additionally, an application of the dampers 112, 800, 900 described herein is not restricted to vehicles and can be used in any application that incorporates a damper.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A damper comprising:
    an inner tube;
    a piston slidably disposed within the inner tube, the piston defining a first working chamber and a second working chamber within the inner tube;
    an outer tube disposed around the inner tube, the outer tube defining an outer chamber between the inner tube and the outer tube, wherein the outer chamber is in fluid communication with the first working chamber;
    a cover member having an outer surface and an inner surface mounted on an outer surface of the outer tube, the cover member defining a collector chamber between the outer tube and the cover member; the cover member comprising first and second apertures in the outer surface of the cover member with the first aperture being spaced from the second aperture;
    a first control valve mounted through the first aperture in the outer surface of the cover member and extending at least from the outer surface of the cover member to the outer surface of the outer tube and at least a portion of the first control valve extending outside of the cover member, wherein an inlet of the first control valve is in fluid communication with the outer chamber, and an outlet of the first control valve is in fluid communication with the collector chamber; and
    a second control valve mounted through the second aperture in the outer surface of the cover member and extending at least from the outer surface of the cover member to the outer surface of the outer tube and at least a portion of the second control valve extending outside of the cover member, with the second control valve spaced apart from the first control valve, wherein an inlet of the second control valve is in fluid communication with the second working chamber, and an outlet of the second control valve is in fluid communication with the collector chamber.

2. The damper of claim 1, wherein a valve axis of each of the first and second control valves is substantially perpendicular to a longitudinal axis of the inner tube.

3. The damper of claim 1, further comprising an accumulator defining an accumulator chamber, wherein the accumulator chamber is in fluid communication with the collector chamber.

4. The damper of claim 3, wherein the accumulator is disposed within the outer tube.

5. The damper of claim 3, wherein the accumulator is disposed externally with respect to the outer tube.

6. The damper of claim 1, further comprising a first check valve disposed within the cover member, the first check valve operable to allow flow of fluid from the collector chamber to the outer chamber.

7. The damper of claim 6, wherein the first check valve is disposed within the first control valve.

8. The damper of claim 1, further comprising a second check valve disposed within the cover member, the second check valve operable to allow flow of fluid from the collector chamber to the second working chamber.

9. The damper of claim 8, wherein the second check valve is disposed within the second control valve.

10. The damper of claim 1, wherein the cover member is welded to the outer surface of the outer tube.

11. The damper of claim 1, wherein a valve housing of the first control valve is welded to the cover member.

12. The damper of claim 1, wherein a valve housing of the second control valve is welded to the cover member.

13. The damper of claim 1, wherein the first control valve is operable to regulate fluid flow from the outer chamber to the collector chamber in response to a motion of the piston towards the first working chamber, the first control valve further operable to prevent fluid flow therethrough in response to a motion of the piston towards the second working chamber.

14. The damper of claim 1, wherein the second control valve is operable to regulate fluid flow from the second working chamber to the collector chamber in response to a motion of the piston towards the second working chamber, the second control valve further operable to prevent fluid flow therethrough in response to a motion of the piston towards the first working chamber.

15. The damper of claim 1, wherein the outer tube defines a first opening to fluidly communicate the outer chamber with the collector chamber, and wherein the inlet of the first control valve is in fluid communication with the first opening.

16. The damper of claim 1, further comprising an end member disposed at an end of the inner tube, the end member defining a passage that fluidly communicates the second working chamber with a second opening of the outer tube, wherein the inlet of second control valve is in fluid communication with the second opening.

17. A damper comprising:
an inner tube;
a piston slidably disposed within the inner tube, the piston defining a first working chamber and a second working chamber within the inner tube;
an outer tube disposed around the inner tube, the outer tube defining an outer chamber between the inner tube and the outer tube, wherein the outer chamber is in fluid communication with the first working chamber;
a cover member having an outer surface and an inner surface and mounted on an outer surface of the outer tube, the cover member defining a collector chamber between the outer tube and the cover member, the cover member comprising first and second apertures in the outer surface of the cover member with the first aperture being spaced from the second aperture;
a first control valve mounted through the first aperture in the outer surface of the cover member and extending at least from the outer surface of the cover member to the outer surface of the outer tube and at least a portion of the first control valve extending outside of the cover member, wherein an inlet of the first control valve is in fluid communication with the outer chamber, and an outlet of the first control valve is in fluid communication with the collector chamber;
a second control valve mounted through the second aperture in the outer surface of the cover member and extending at least from the outer surface of the cover member to the outer surface of the outer tube and at least a portion of the second control valve extending outside of the cover member, with the second control valve spaced apart from the first control valve, wherein an inlet of the second control valve is in fluid communication with the second working chamber, and an outlet of the second control valve is in fluid communication with the collector chamber;
a first check valve disposed within the cover member, the first check valve operable to allow flow of fluid from the collector chamber to the outer chamber; and
a second check valve disposed within the cover member, the second check valve operable to allow flow of fluid from the collector chamber to the second working chamber.

18. The damper of claim 17, wherein a valve axis of each of the first and second control valves is substantially perpendicular to a longitudinal axis of the inner tube.

19. A damper comprising:
an inner tube;
a piston slidably disposed within the inner tube, the piston defining a first working chamber and a second working chamber within the inner tube;
an outer tube disposed around the inner tube, the outer tube defining an outer chamber between the inner tube and the outer tube, wherein the outer chamber is in fluid communication with the first working chamber;
a cover member having an outer surface and an inner surface and mounted on an outer surface of the outer tube, the cover member defining a collector chamber between the outer tube and the cover member, the cover member comprising first and second apertures in the outer surface of the cover member with the first aperture being spaced from the second aperture;
a first control valve mounted through the first aperture in the outer surface of the cover member and extending at least from the outer surface of the cover member to the outer surface of the outer tube and at least a portion of the first control valve extending outside of the cover member, wherein an inlet of the first control valve is in fluid communication with the outer chamber, and an outlet of the first control valve is in fluid communication with the collector chamber;
a second control valve mounted through the second aperture in the outer surface of the cover member and extending at least from the outer surface of the cover member to the outer surface of the outer tube and at least a portion of the second control valve extending outside of the cover member, with the second control valve spaced apart from the first control valve, wherein an inlet of the second control valve is in fluid communication with the second working chamber, and an outlet of the second control valve is in fluid communication with the collector chamber;
a first check valve disposed within the first control valve, the first check valve operable to allow flow of fluid from the collector chamber to the outer chamber; and
a second check valve disposed within the second control valve, the second check valve operable to allow flow of fluid from the collector chamber to the second working chamber.

20. The damper of claim 19, wherein a valve axis of each of the first and second control valves is substantially perpendicular to a longitudinal axis of the inner tube.

* * * * *